United States Patent
Cantrell et al.

(10) Patent No.: US 6,651,126 B1
(45) Date of Patent: Nov. 18, 2003

(54) SNAPSHOT ARBITER MECHANISM

(75) Inventors: Jay T. Cantrell, Naperville, IL (US); Mark A. Granger, Carol Stream, IL (US); Ravishankar Kodavarti, Des Plaines, IL (US)

(73) Assignee: Texas Instruments Incorporated, Dallas, TX (US)

( * ) Notice: Subject to any disclaimer, the term of this patent is extended or adjusted under 35 U.S.C. 154(b) by 460 days.

(21) Appl. No.: 09/660,102

(22) Filed: Sep. 12, 2000

Related U.S. Application Data

(60) Provisional application No. 60/162,257, filed on Oct. 29, 1999.

(51) Int. Cl.[7] .............................................. G06F 13/00
(52) U.S. Cl. ...................................... 710/264; 710/262
(58) Field of Search ................................ 710/260, 262, 710/263, 266, 264

(56) References Cited

U.S. PATENT DOCUMENTS

| | | | | |
|---|---|---|---|---|
| 5,758,169 A | * | 5/1998 | Nizar et al. | 710/266 |
| 5,848,279 A | * | 12/1998 | Wu et al. | 710/268 |
| 5,918,057 A | * | 6/1999 | Chou et al. | 710/260 |
| 6,240,483 B1 | * | 5/2001 | Gutta et al. | 710/260 |

* cited by examiner

*Primary Examiner*—Glenn A. Auve
(74) *Attorney, Agent, or Firm*—J. Dennis Moore; W. James Brady, III; Frederick J. Telecky, Jr.

(57) ABSTRACT

A snapshot arbiter system for servicing multiple interrupt requests for a central processing unit (CPU) in a digital processor system, and for providing interrupts to the CPU corresponding to the interrupt requests. The system includes a synchronizer adapted to synchronize interrupt requests to a clock as they are received, and an interrupt masker adapted to receive a set of indicators identifying interrupt requests to be masked and to output active indicators that are a set of active interrupt request values corresponding to received interrupt requests that are not masked. Also included is a priority encoder block adapted to receive a set of priority values for respective interrupt requests and to provide as an output priority indicators that are a set of codes representing the priority values. A snapshot enable block is included, adapted to store enable indictors that are a set of bits representing currently enabled interrupt requests, and output those bits as enable bits. Also included is a snapshot register adapted to receive the active indicators and the enable indicators, and to output snapshot indicators that are a set of values representing the currently active and enabled interrupts. An interrupt generation block is included, adapted to receive the snapshot indicators and the priority indicators, and to output an interrupt corresponding to a highest priority interrupt request, to output a highest indicator representing a highest interrupt priority level in the snapshot register, and to output for reading by the CPU an identification indicator representing a currently selected interrupt request. Finally, an interrupt preemption block is included, adapted to receive the priority indicators, the active indicators and the highest indicator, and to output to the snapshot enable block a set of bits corresponding to each current interrupt request higher in priority than all of the interrupt requests represented in the snapshot register, for updating the snapshot enable block.

2 Claims, 3 Drawing Sheets

SNAPSHOT ARBITER MECHANISM

This application claims priority under 35 U.S.C. §119(e)(1) of provisional application No. 60/162,257 filed Oct. 29, 1999.

TECHNICAL FIELD OF THE INVENTION

This invention relates to digital processors, and more particularly relates to methods for servicing multiple interrupts on a priority basis.

BACKGROUND OF THE INVENTION

Priority based request arbitration systems determine the next request to be serviced, i.e., the "winner," based upon which request priority is highest, pending and enabled. Priority assignments are generally based on degrees of importance, in this case of requests. If multiple requests are programmed to the same priority, fairness protocols are used to determine the next winner. A mechanism is fair when any given request is not serviced twice until all pending requests are serviced once. Such arbitration systems are frequently used in digital processor interrupt servicing systems. In fact, throughout this document the term "request" and "interrupt" are used synonymously (an interrupt is a request for service).

The simplest fairness protocol is system based and ensures that a request does not occur twice for a predetermined length of time. This type of fairness includes Rate Monotonic Scheduling Theory (Louis Sha from Carnegie Mellon University). However, for many systems, requests are not able to be deterministically scheduled a priori.

A second form of fairness protocol is "First Come First Served (FCFS)" (Udi Manber and Mary Vernon, University of Wisconsin). In this protocol, each time the source of the request loses, it increments a counter. The counter value is used as the least significant bits of the priority field to determine the next winner. When multiple requests are all of the same priority value the leftmost is selected as the winner. This mechanism is gate intensive and potentially slows the rate at which the next winner can be determined.

Another mechanism commonly used in busses like Futurebus+ is "Round Robin" (Udi Manber and Mary Vernon, University of Wisconsin). In this protocol, a module checks if it lost and the winner is to the left (arbitrarily but consistently ordered) of itself. If so, it sets a round robin bit which is used as the least significant bit of the priority value to determine the winner. When multiple requests are all of the same priority value the leftmost is selected as the winner. This mechanism is a vast improvement over First Come First Served by reducing the effect on the amount of storage needed to determine fairness and also to reduce the time required to determine the winner.

However, there is a need to further reduce the storage necessary, in most cases, and the time required to determine a winner in priority based request arbitration systems.

SUMMARY OF THE INVENTION

The present invention provides a snapshot arbiter system for servicing multiple interrupt requests for a central processing unit (CPU) in a digital processor system, and for providing interrupts to the CPU corresponding to the interrupt requests. The system includes a synchronizer adapted to synchronize interrupt requests to a clock as they are received, and an interrupt masker adapted to receive a set of indicators identifying interrupt requests to be masked and to output active indicators that are a set of active interrupt request values corresponding to received interrupt requests that are not masked. Also included is a priority encoder block adapted to receive a set of priority values for respective interrupt requests and to provide as an output priority indicators that are a set of codes representing the priority values. A snapshot enable block is included, adapted to store enable indictors that are a set of bits representing currently enabled interrupt requests, and output those bits as enable bits. Also included is a snapshot register adapted to receive the active indicators and the enable indicators, and to output snapshot indicators that are a set of values representing the currently active and enabled interrupts. An interrupt generation block is included, adapted to receive the snapshot indicators and the priority indicators, and to output an interrupt corresponding to a highest priority interrupt request, to output a highest indicator representing a highest interrupt Priority level in the snapshot register. and to output for reading by the CPU an identification indicator representing a currently selected interrupt request. Finally, an interrupt preemption block is included, adapted to receive the priority indicators. the active indicators and the highest indicator, and to output to the snapshot enable block a set of bits corresponding to each current interrupt request higher in priority than all of the interrupt requests represented in the snapshot register, for updating the snapshot enable block.

The present invention is equally applicable to any request/grant arbitration protocol.

These and other features of the invention will be apparent to those skilled in the art from the following detailed description of the invention, taken together with the accompanying drawings.

DETAILED DESCRIPTION OF THE PREFERRED EMBODIMENT

The preferred embodiment of the present invention provides a method for servicing multiple interrupts for a central processing unit ("CPU") in a digital processing system. The method utilizes a register, called herein the "snapshot register," and designated "snapshot_reg." At a high level, the method includes the following steps:

1. take a sample of pending requests (snapshot_reg<-pending requests) anytime the snapshot register is empty (snapshot_reg=0).
2. remove requests from the snapshot register when they are serviced.

3. add requests to the snapshot register if they are higher priority than any request in the snapshot register (preemption).

In the preferred embodiment, the snapshot register can be provided with little additional gate count since it can be combined with synchronization flip flops at the request synchronizer. Also, since no bits are added to the priority field, the preferred embodiment can run faster than systems implementing prior art methods. The preferred embodiment has also added a preemption mechanism that such prior art methods do not provide.

Figure 1:
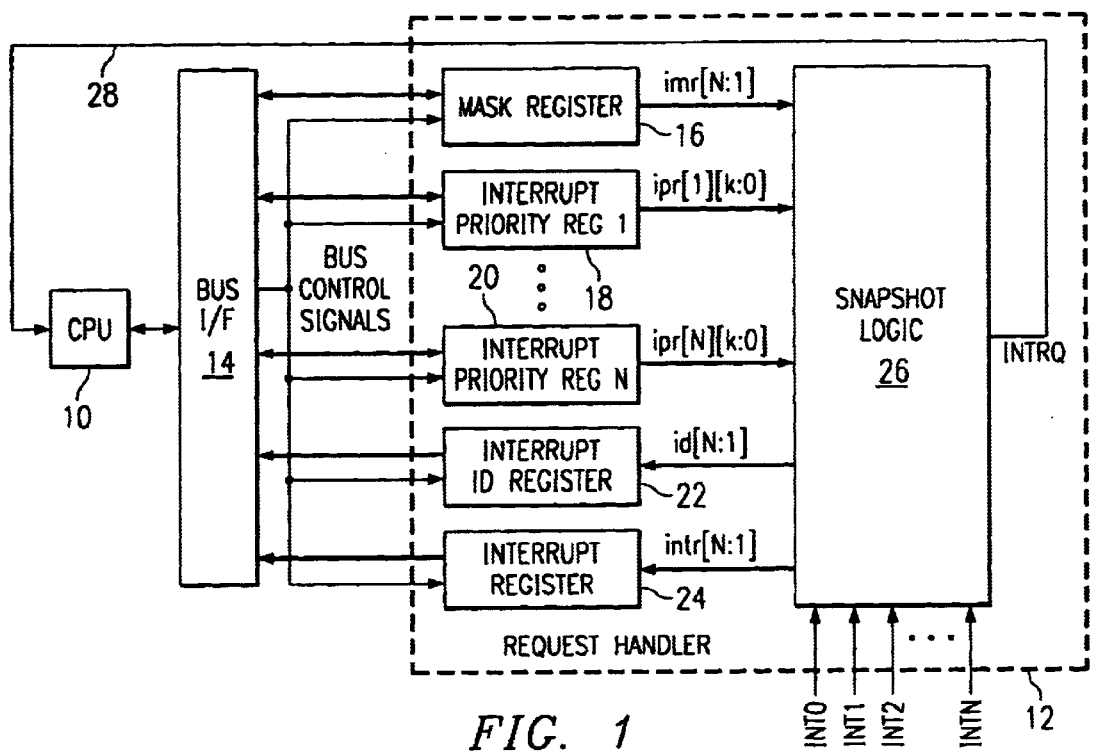
FIG. 1 is a block diagram showing a CPU system including a Request Handler in accordance with a preferred embodiment of the present invention, in which the CPU is capable of receiving one interrupt.

FIG. 1 is a block diagram showing a CPU system with a CPU 10 talking to a Request Handler 12 through a bus interface 14. The Request Handler 12 receives different requests INT0, INT1, INT2, . . . INTN, from other parts of the system, which are not shown, since they are not relevant to the instant invention. The CPU 10 has only one hardware interrupt and the responsibility of the Request Handler 12 is to route multiple requests to the CPU 10 in a fair and efficient manner. The fairness mechanism used by the Request Handler 12 implements the preferred embodiment of the present invention.

The Request Handler 12 receives the address bus, data in and data out buses, and the control signals from the CPU 10 through the Bus interface 14. These signals are used to read and write out of the registers of the Request Handler 12. The Request Handler 12 processes the next interrupt to be serviced by the CPU 10 based on the contents of the registers and on the system requests.

In this system, the Request Handler 12 interrupts the CPU 10. The CPU 10 then reads the Interrupt ID (IID) register 22, described in detail in the following section, to determine which peripheral in the system needs to be serviced. In this system, the read from the IID register 22 also serves as an Interrupt Acknowledge from the CPU 10. However, a hardware mechanism, if existing, could also serve as a method of acknowledging the interrupt by the CPU 10. Either level sensitive or edge sensitive requests could be used by the peripherals to talk to the Request Handler 12. In the case of the level sensitive interrupts, the Interrupt service routine software needs to take action to release the request by the peripheral.

The Request Handler 12 produces one output, INTRQ, on line 28 which is used to interrupt the CPU. The Request Handler 12 contains the following registers:

1. Interrupt Mask register (IMR) 16

The CPU 10 can read from and write to this register. The IMR register is N bits wide, where N is the number of system requests, and stores N bits referred to collectively as imr. Each of these bits corresponds to a unique interrupt. Each of the interrupts can be masked based on a value at the corresponding bit position in the register. If a request is masked, then it will not be allowed to participate in the servicing mechanism.

2. Interrupt ID register (IID) 22

The CPU 10 can only read from this register. The IID register 22 is also N bits wide, and stores N bits referred to collectively as id. Each of these bits corresponds to a unique interrupt. When an interrupt needs to be serviced by the CPU 10, the Request Handler 12 asserts the INTRQ output to the CPU 10, and a corresponding bit in the IID register 22 is also set. This b it is cl eared on a read from the CPU 10 to t his register.

3. Interrupt Priority registers (IPR) (one for each request) 18–20

The CPU 10 can read from and write to each of the registers. Each register is k bits wide, where k is log 2 N, and stores a value ipr[n], where n is a value from 1 to N identifying the particular interrupt. The value in the IPR determines a priority between 0 and N−1 for each of the interrupts from the system.

4. Interrupter register (INTR) 24

The CPU 10 can read from this register. It stores N bits referred to collectively as intr, which indicate the current status of the requests from the system peripherals to the Request Handler 12. The interrupts are either synchronized to the clock of the Request Handler 12, or they can be asynchronous.

Figure 2:
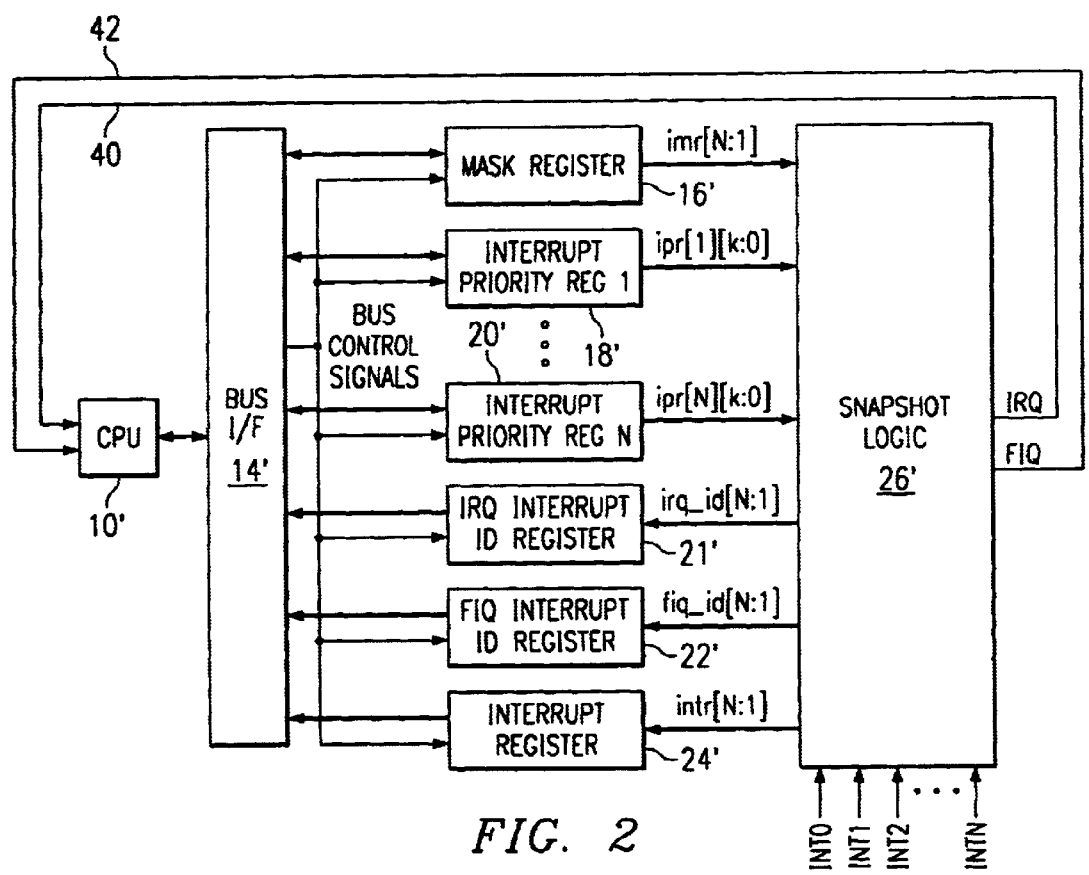
FIG. 2 is a block diagram showing a CPU system including a Request Handler in accordance with a preferred embodiment of the present invention, in which the CPU is capable of receiving two interrupts.

FIG. 2 shows a system with a CPU 10' talking to a Request Handler 12' through a bus interface 14'. The CPU 10' is capable of receiving two interrupts called the IRQ interrupt and the FIQ interrupt, generated in response to requests INT0, INT1, INT2, . . . INTN, from different parts of the system (not shown. In this system, Snapshot Logic 26' of the Request Handler 12' produces two outputs, IRQ and FIQ, on lines 40 and 42, respectively, based on the status of the requests and the values in certain registers in the system. These registers are the Interrupt Mask register (IMR) 16', the Interrupt Priority registers (IPR) (one for each request) 18'–20', the IRQ Interrupt ID register (IID) 21' and the FIQ Interrupt ID register 22', and the Interrupter register (INTR) 24'. These registers have the same function as the corresponding registers in FIG. 1, with the IRQ Interrupt ID register (IID) 21' and the FIQ Interrupt ID register 22' performing a similar function to the IID register 22 of FIG. 1, but setting a bit only if the interrupt is to be an IRQ interrupt or an FIQ interrupt, respectively. The software executed in the CPU 10' can program each interrupt to be either an IRQ or an FIQ interrupt by setting a bit in an IPR register 18'–20'. This allows the Request Handler 12' to route a request as either an IRQ interrupt or an FIQ interrupt.

The following section describes the Request Handler 12, and the fairness mechanism used to determine the next request to be serviced in more detail. The principles described in connection with Request Handler 12 also apply to Request Handler 12'.

Figure 3:
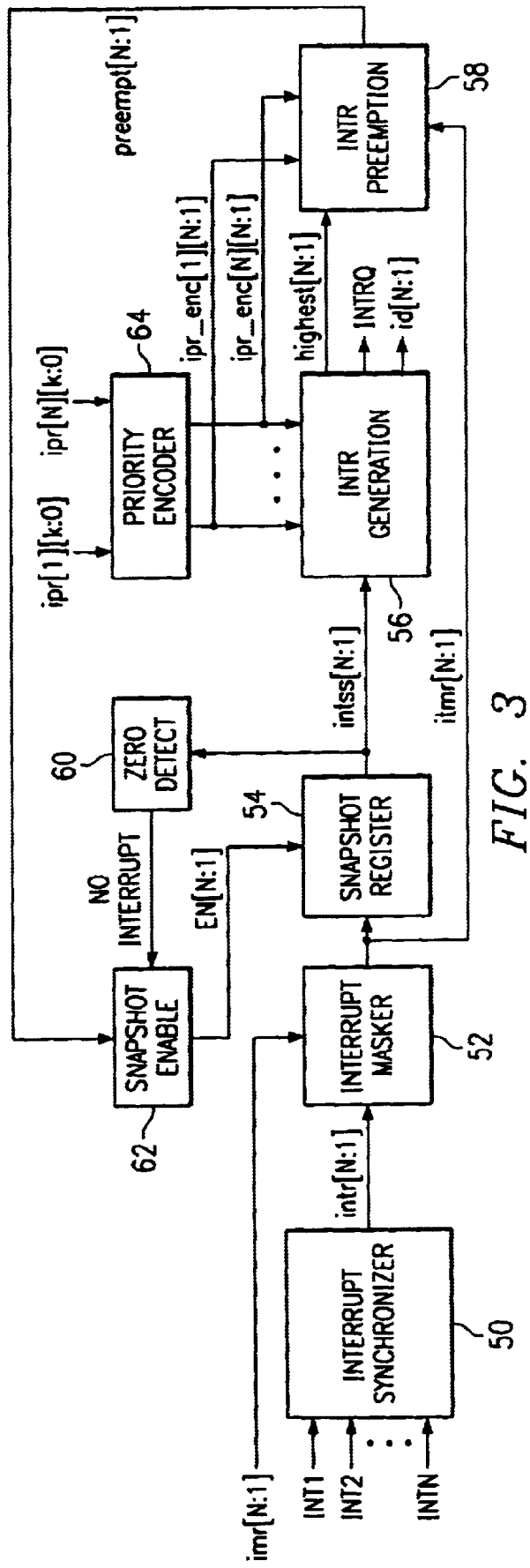
FIG. 3 is a block diagram showing the construction of the Snapshot Logic 26 of FIG. 1.

FIG. 3 is a block diagram showing the construction of the Snapshot Logic 26. The Snapshot Logic 26, takes inputs from the interrupt mask register 16, the Interrupt Priority registers 18–20, the Interrupt ID registers 22, and the system interrupts INT[N:0]. The Snapshot logic 26 processes the system interrupts and generates interrupts, INTRQ, to the CPU 10 (FIG. 1). The Snapshot Logic 26 includes the following blocks: an Interrupt Synchronizer block 50, an Interrupt Masker block 52, a Snapshot Register 54, an Interrupt Generation block 56, an Interrupt Preemption block 58, a Zero Detect block 60, a Snapshot Enable Block 62 and a Priority Encoder block 64.

In single CPU interrupt operation, synchronous and asynchronous system interrupts INT[N:0] pass into the Interrupt Synchronizer block 50. This block synchronizes the interrupts to the system clock. The output of the Interrupt Synchronizer block 50, intr[N:1], is an N bit value which indicates the active system interrupts.

The Interrupt Masker block 52 performs a bit wise ANDing of the intr[N:1] bits and the corresponding interrupt mask register bits imr[N:1]. The output of the Interrupt Masker block 52, itmr[N:1], represents the currently active and enabled interrupts. This N bit value is passed to the Snapshot Register block 54 and to the Interrupt Preemption block 58.

The Snapshot Register block 54 receives itmr[N:1] from the Interrupt Masker block 52 and an enable input EN[N:1] from the Snapshot Enable block 62., and outputs an N bit value, intss[N:1], identifying the currently active and enabled interrupts, i.e., a "snapshot" of the currently active and enabled interrupts. This "snapshot" of the currently active and enabled interrupts is sampled or modified under various conditions as determined by the Snapshot Enable block 62.

The Priority Encoder block 64 encodes the values in the Interrupt Priority registers 18–20 (FIG. 1). The Interrupt Priority registers contain the classification and priority level for each interrupt. For each interrupt the priority level is encoded as a field of ones and zeros. For a system where N=3, a priority of zero is represented as "000," a priority of one is "001," a priority of two is "011" and a priority of three is "111." The priority encoder outputs for each system interrupt an N bit value ipr_enc[n][N:1], where n is a value from 1 to N identifying the particular interrupt.

Figure 4:
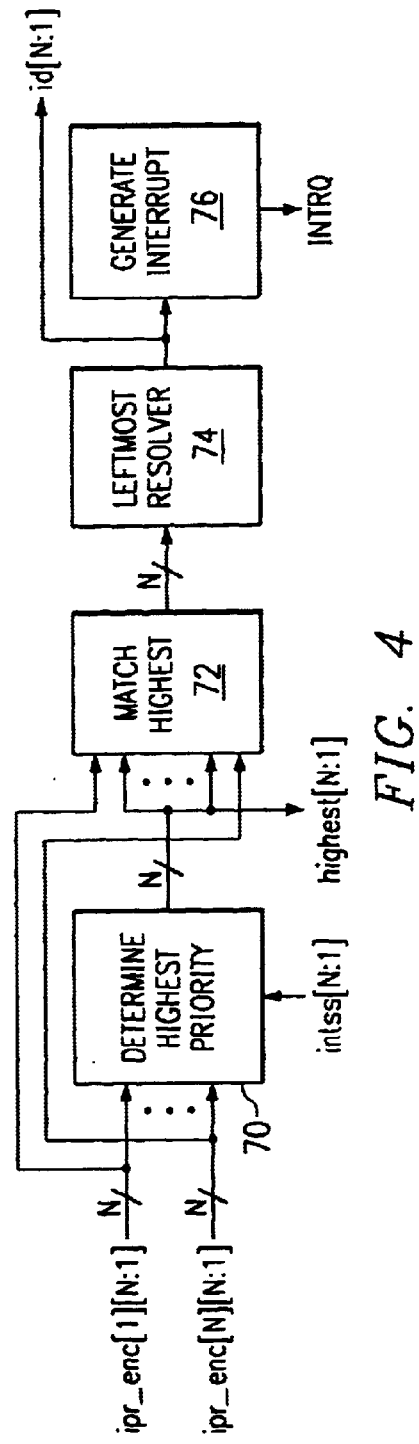
FIG. 4 is a block diagram of the INTR Generation block 56 of FIG. 1.

The output of the priority encoder is sent to the INTR Generation block 56. FIG. 4 is a block diagram of the INTR Generation block 56. The INTR Generation block 56 includes four sub-blocks, a Highest Priority sub-block 70, a Match Highest sub-block 72, a Leftmost Resolver sub-block 74 and a Generate Interrupt sub-block 76 (see FIG. 4).

The Highest Priority sub-block 70 does a bitwise OR-ing of the priority encoded interrupts ipr_enc[n][N:1] and the output of the Snapshot Register block 54, intss[N:1]. The resultant value, highest[N:1], represents the highest interrupt priority level in the snapshot register.

The Highest Priority sub-block 70 output, highest[N:1], and the output of the Priority Encoder block 64, ipr_enc[n][N:1], are fed to the Match Highest sub-block 72. The Match Highest sub-block 72 compares the priority of the snapshot to the value of the Highest Priority sub-block 70. A bit is set for each interrupt which matches the highest value. The results of the match are bitwise ANDed with the snapshot register and the enabled interrupts to ensure the interrupts with the highest priority are currently active and enabled. This final result is provided as an N bit output of the Match Highest sub-block 72.

The Leftmost Resolver sub-block 74 receives the N bit output from the Match Highest sub-block 72 and determines which of the interrupts is the leftmost in the N-bit field of ones and zeros. In the logic convention adopted for the purposes of this discussion Intr_N is considered the leftmost, and Intr_1 is considered the rightmost. This is arbitrary, but, of course, some convention must be adopted. The Leftmost Resolver sub-block 74 outputs an N-bit value with one bit enabled to correspond to the winning leftmost interrupt. This value is stored in the Interrupt ID register 22 (FIG. 1) and provided to the Generate Interrupt sub-block 76. The Generate Interrupt sub-block 76 asserts the CPU interrupt line INTR.

The flow in the INTR Generation block 56 of FIG. 4 is illustrated by the following example. For the example it is assumed that N=3 and that there are three interrupt priority levels. It is also assumed that Intr_3 and Intro_1 have been set to the highest priority and that Intr_2 has been set to the lowest priority. All three of the interrupts are currently in the Snapshot Register block 54 and the interrupt priority levels have been encoded in Priority Encoder block 64. The Highest Priority sub-block 70 ORs the priority levels of the three snapshot interrupts as shown, (intr_3=11) bitwise or (intr_2=00) bitwise or (intr_1=11) =11. The 11 value is passed to the Match Highest sub-block 72 and the interrupt priority levels a re compared. The Match Highest sub-block 72 produces in an output of 101 since intr_3 and intr_1 are at the highest priority. The Leftmost Resolver sub-block 74 determines that intr_3 is the "leftmost" interrupt and output a value of 100. The 100 is stored in the Interrupt ID registers 22 and the Generate Interrupt sub-block 76 asserts the INTRQ line.

Figure 5:
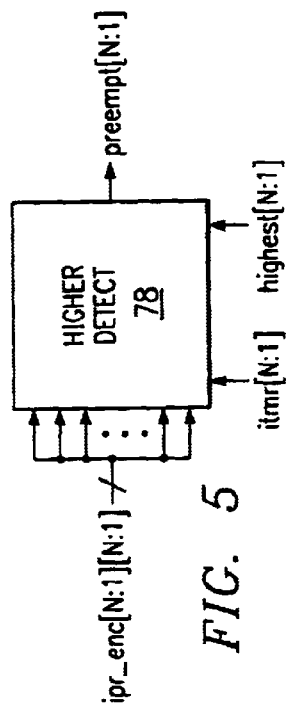
FIG. 5 is a more detailed diagram of the Interrupt Preemption block 58 of FIG. 3.

The Interrupt Preemption block 58, shown in FIG. 5, is comprised, essentially, of a Higher Detect sub-block 78. It takes the output, ipr_enc[n][N:1], of the Priority Encoder block 64, the output, itmr[N:1], of the Interrupt Masker block 52, and the highest interrupt value, highest[N:1], from the INTR Generation block 56. The encoded interrupts are fed to the Higher Detect sub-block 78. This block compares the encoded interrupts with the highest signal. For each current interrupt higher in priority than all of the interrupts in the snapshot register, a bit is set corresponding to the left to right convention used through the rest of the logic. The N bit output, preempt[N:1], is fed to the snapshot enable logic which updates the snapshot register with these new bits.

The Snapshot Enable block 62 can now be better defined. Several conditions cause the snapshot to be updated. These conditions are:

A. Snapshot register bits are added to when:
1. The snapshot register is empty; the current interrupts are sampled.
2. The preemption circuitry detects active and enabled interrupts with higher priority so the corresponding snapshot bits are set.

B. Snapshot register bits are removed when:
1. An interrupt service register is read; the corresponding interrupt bit is cleared.
2. An active interrupt's mask bit is cleared; the corresponding snapshot bit is cleared.
3. An interrupt is disabled before being serviced; the corresponding interrupt bit is cleared.

Figure 6:
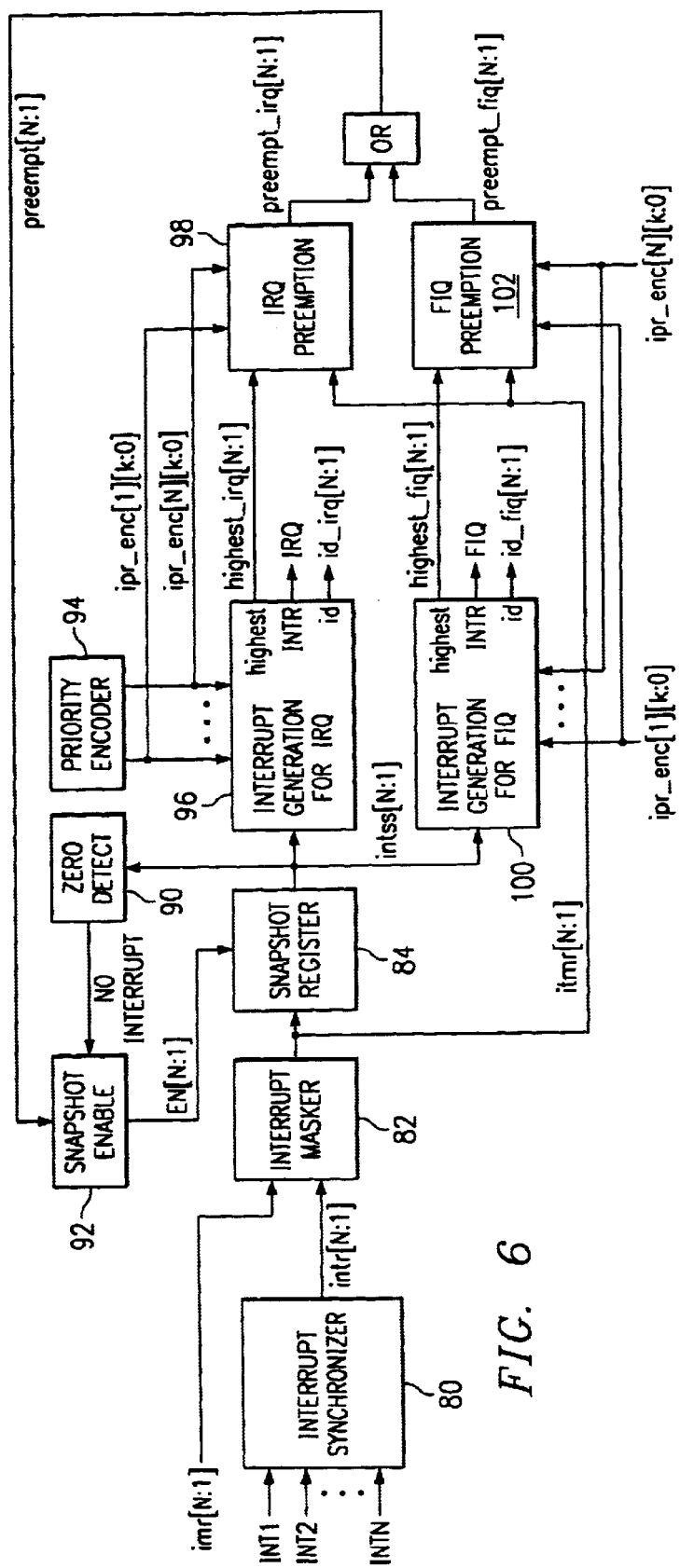
FIG. 6 is a block diagram showing a CPU system including a Request Handler in accordance with a preferred embodiment of the present invention, having multiple CPUs.

In systems having multiple CPUs, multiple instances of the INTR generation block and the INTR preemption block are required in the snapshot logic blocks of such systems. Such systems have multiple interrupt classes, and there are separate interrupt generation and interrupt preemption blocks for IRQ interrupts and FIQ interrupts. An example of the snapshot logic for such a system is shown in FIG. 6. As in the Snapshot Logic Block 26 of FIG. 3, the snapshot logic of FIG. 6 includes the following blocks: an Interrupt Synchronizer block 80, an Interrupt Masker block 82, a Snapshot Register 84, a Zero Detect block 90, a Snapshot Enable Block 92 and a Priority Encoder block 94. However, instead of a single Interrupt Generation block and a single Interrupt Preemption block, the snapshot logic of FIG. 6 includes an IRQ Interrupt Generation block 96, an IRQ Interrupt Preemption block 98, and an FIQ Interrupt Generation block 100, and an FIQ Interrupt Preemption block 102.

Only one snapshot register and one priority encoder is required for a multiple class system in which the snapshot logic FIG. 6 is used. To differentiate between an FIQ interrupt and an IRQ interrupt, a bit is added to the interrupt priority register indicating whether the interrupt request is an FIQ or IRQ interrupt request. That bit is used to create separate FIQ enable signals ipr_enc[n][k:0] and IRQ enable signals ipr_enc[n][k:0] in the Priority Encoder block 94, where, again, n is a value from 1 to N identifying the particular interrupt. The Priority Encoder block 94 sends these N bit enable signals to the associated FIQ or IRQ logic blocks. The snapshot update enable block changes slightly to handle situations involved with multiple classes.

Note that the method may be applied to systems having any number of CPU interrupts. Assuming the number of such interrupts in a given system is N, then $\log_2 N$ bits would need to be reserved to identify the CPU interrupt. Also note that these bits may be located in the interrupt priority registers, as in the preferred embodiment, but they could be located elsewhere, so long as they are available to the priority encoder block of such system to create separate enable signals for each interrupt.

With multiple interrupt classes each instance of the generation and preemption block performs its logical operations only for the system interrupts in its class. In the described circuitry assuming three system interrupts and intr_3 and intr_2 are IRQ interrupts, and intr_1 is an FIQ interrupt, 3 and 2 is processed by the IRQ interrupt generation and preemption blocks. Interrupt 1 is processed by the FIQ interrupt generation and preemption blocks. Each instance of the interrupt generation block stores the winning interrupt in the correct ID register and asserts its CPU interrupt line. Each interrupt generation block passes its "highest" signal to associated interrupt preemption circuitry. Each interrupt preemption block outputs a preempt signal which corresponds to only its related system interrupts. The output of each preemption block is bitwise or-ed to create a preempt signal for the snapshot enable logic. The snapshot update enable block is modified to operate in the following manner:

A. Snaphot register bits are added to when:
  1. The snapshot register is empty; the current interrupts are sampled.
  2. The snapshot register does not contain any interrupts of a class; the current enabled interrupts of the class are added.
  3. The preemption circuitry detects active and enabled interrupts with higher priority than other interrupts in the same class; the corresponding snapshot bits are set.

B. Snapshot register bits are removed when:
  1. An interrupt service register is read; the corresponding interrupt bit is cleared.
  2. An active interrupt's mask bit is cleared; the corresponding snapshot bit is cleared.
  3. An interrupt is disabled before being serviced; the corresponding interrupt bit is cleared.

The following additional variations are possible for use in implementing the above described logic.
  1. A write one to clear method could be used to clear serviced interrupts from the snapshot.
  2. The interrupt synchronizer could be removed if the system interrupts were known to be synchronous or if an asynchronous interrupt generation mechanism was desired.
  3. The priority encoder could be removed and raw priority values used or the encoding method could be modified to meet the particular needs of a given system.
  4. The left to right resolver could be implemented as a right to left mechanism or any other fixed pattern of resolving which interrupt to service.

Although the present invention and its advantages have been described in detail, it should be understood that various changes, substitutions and alterations can be made herein without departing from the spirit and scope of the invention as defined by the appended claims.

What is claimed is:

1. A method for servicing multiple interrupt requests for a central processing unit in a digital processor system, comprising the steps of:

providing storage locations for indicating at least some of one or more of said interrupt requests that are pending;

loading said storage locations with indications of sending interrupt requests when said storage locations are storing no pending interrupt request indications;

removing indications of pending interrupt requests from said storage locations when they are serviced;

selecting an interrupt request for which an indication is stored in said storage locations; and generating an interrupt for said selected interrupt request, wherein said step of selecting is performed by selecting said interrupt request according to a predetermined procedure, and wherein:
  said step of loading is performed by storing said indications as bits, wherein each bit represents an indication, and said bits are stored in storage locations according to a predetermined arrangement; and
  said step of selecting is performed by selecting said interrupt request that occupies a left most storage location.

2. A snapshot arbiter system for servicing multiple interrupt requests for a central processing unit (CPU) in a digital processor system, and for providing interrupts to the CPU corresponding to the interrupt requests, comprising:

a synchronizer adapted to synchronize interrupt requests to a clock as they are received;

an interrupt masker adapted to receive a set of indicators identifying interrupt requests to be masked and to output active indicators that are a set of active interrupt request values corresponding to received interrupt requests that are not masked;

a priority encoder block adapted to receive a set of priority values for respective interrupt requests and to provide as an output priority indicators that are a set of codes representing the priority values;

a snapshot enable block adapted to store enable indictors that are a set of bits representing currently enabled interrupt requests, and output those bits as enable bits;

a snapshot register adapted to receive the active indicators and the enable indicators, and to output snapshot indicators that are a set of values representing the currently active and enabled interrupts;

an interrupt generation block adapted to receive the snapshot indicators and the priority indicators, and to output an interrupt corresponding to a highest priority interrupt request, to output a highest indicator representing a highest interrupt priority level in the snapshot register, and to output for reading by the CPU an identification indicator representing a currently selected interrupt request;

an interrupt preemption block adapted to receive the priority indicators, the active indicators and the highest indicator, and to output to the snapshot enable block a set of bits corresponding to each current interrupt request higher in priority than all of the interrupt requests represented in the snapshot register, for updating the snapshot enable block.

* * * * *